United States Patent
Wells et al.

(10) Patent No.: US 11,788,259 B2
(45) Date of Patent: Oct. 17, 2023

(54) RETAINER SLEEVE WITH AN ANTI-ROTATION FEATURE

(71) Applicant: Caterpillar Inc., Peoria, IL (US)

(72) Inventors: Corey Wells, Peoria, IL (US); Douglas Charles Serrurier, Morton, IL (US); Jason Jura, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 189 days.

(21) Appl. No.: 17/304,263

(22) Filed: Jun. 17, 2021

(65) Prior Publication Data

US 2022/0403628 A1 Dec. 22, 2022

(51) Int. Cl.
*E02F 9/28* (2006.01)

(52) U.S. Cl.
CPC .......... *E02F 9/2833* (2013.01); *E02F 9/2841* (2013.01); *E02F 9/2858* (2013.01)

(58) Field of Classification Search
CPC ..... E02F 9/2833; E02F 9/2841; E02F 9/2858; E02F 9/2825; E02F 9/2808; E02F 9/2816; F16B 1/02; F16B 2/241; F16B 21/12
See application file for complete search history.

(56) References Cited

U.S. PATENT DOCUMENTS

| | | | |
|---|---|---|---|
| 4,006,659 A | 2/1977 | Wurzel et al. | |
| 4,716,668 A | 1/1988 | Hahn | |
| 8,397,405 B2 | 3/2013 | Harder et al. | |
| 10,544,568 B2 | 1/2020 | Serrurier et al. | |
| 2007/0092852 A1* | 4/2007 | Le Bars | F16L 37/0915 433/173 |
| 2008/0148608 A1* | 6/2008 | Harder | E02F 9/2858 37/455 |
| 2013/0145659 A1* | 6/2013 | LaHood | E02F 9/2883 37/453 |
| 2017/0328037 A1* | 11/2017 | Serrurier | E02F 9/2833 |
| 2020/0378092 A1 | 12/2020 | Wells et al. | |
| 2020/0378093 A1 | 12/2020 | Wells et al. | |

FOREIGN PATENT DOCUMENTS

| | | | | |
|---|---|---|---|---|
| JP | 2017198065 A | * | 11/2017 | ............ E02F 9/267 |
| WO | 2021034433 A1 | | 2/2021 | |

\* cited by examiner

*Primary Examiner* — Jessica H Lutz
*Assistant Examiner* — Blake E Scoville

(57) ABSTRACT

In some implementations, a retainer sleeve may include a body including an at least partially annular configuration defining a retainer axis. The body may include an inner surface configured to rotatably receive an outer surface of a lock. The body may include a plurality of plates circumferentially joined together with respect to the retainer axis, where a first plate of the plurality of plates includes a first leg joined to the first plate extending away from the retainer axis and configured to contact a lock cavity of the lock. The body may include an anti-rotation feature, disposed on the first plate, extending inward from the inner surface toward the retainer axis, the anti-rotation feature including a locking surface configured to contact a lock skirt of the lock, the locking surface disposed at a first angle with respect to a bottom end of the first plate.

18 Claims, 9 Drawing Sheets

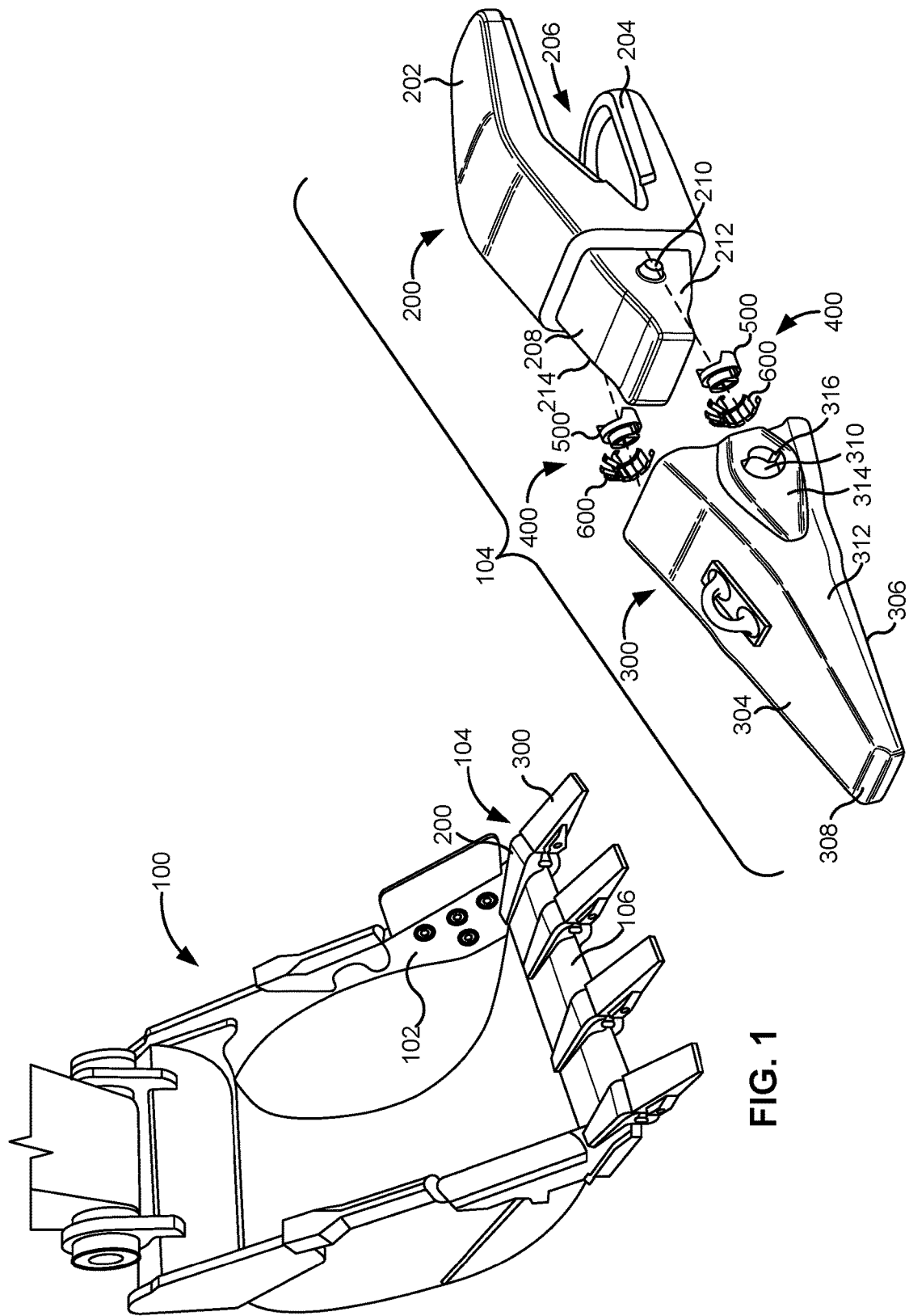

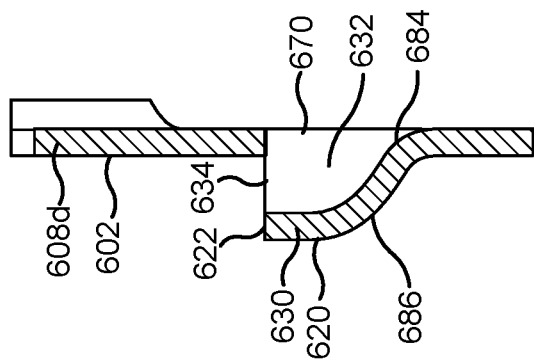
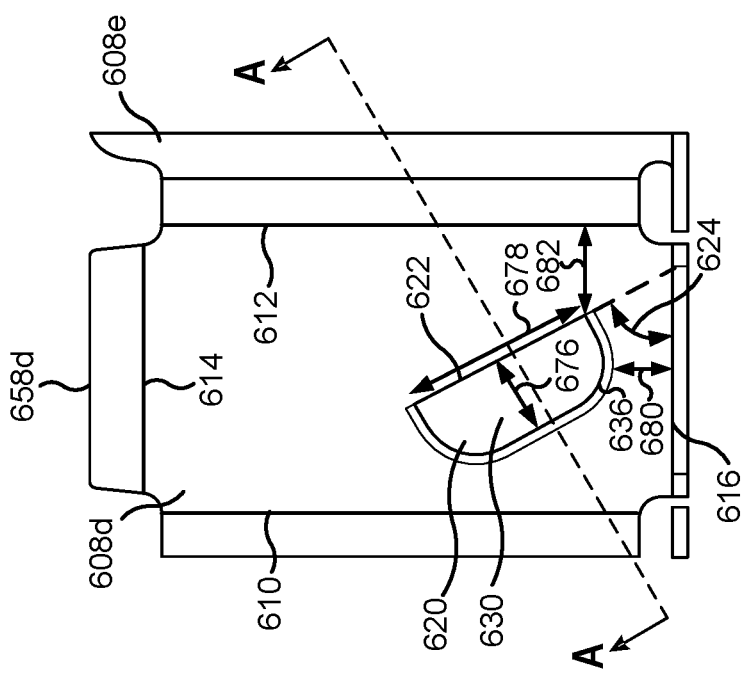

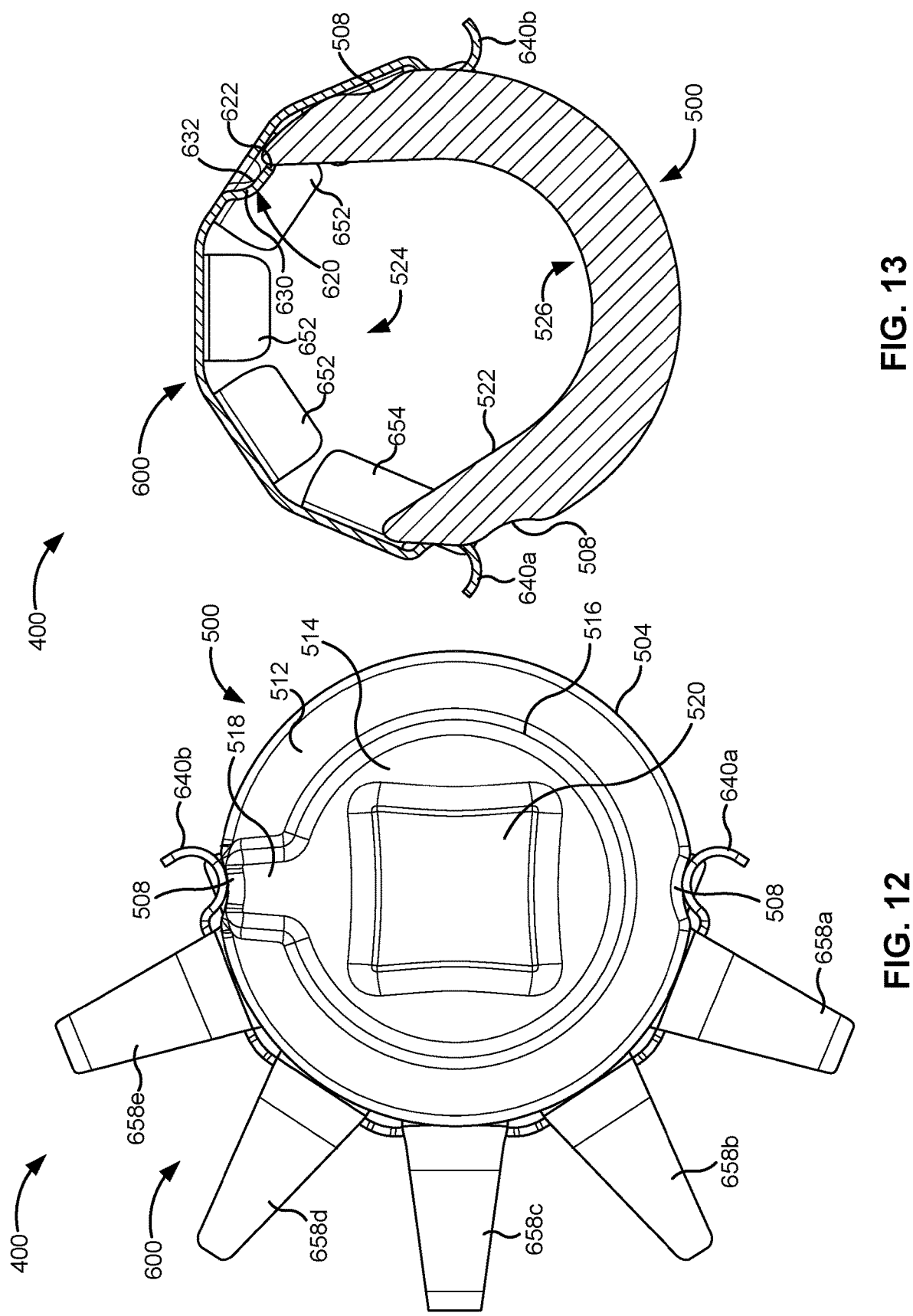

RETAINER SLEEVE WITH AN ANTI-ROTATION FEATURE

TECHNICAL FIELD

The present disclosure relates generally to ground engaging tools and, for example, to a retainer sleeve with an anti-rotation feature.

BACKGROUND

Earth-working machines, such as, for example, excavators, wheel loaders, hydraulic mining shovels, cable shovels, bucket wheels, bulldozers, and draglines, are generally used for digging or ripping into the earth or rock and/or moving loosened work material from one place to another at a worksite. These earth-working machines include various earth-working implements, such as a bucket or a blade, for excavating or moving the work material. These implements may be subjected to extreme wear from the abrasion and impacts experienced during the earth-working applications.

To protect these implements against wear, and thereby prolong the useful life of the implements, various ground engaging tools, such as teeth, edge protectors, and other wear members, may be provided to the earth-working implements in the areas where the most damaging abrasions and impacts occur. These ground engaging tools are removably attached to the implements using customized retainer systems, so that worn or damaged ground engaging tools may be readily removed and replaced with new ground engaging tools. Vibrations or loads on the implements or the ground engaging tools may cause a movement or a rotation of the ground engaging tools. This movement or rotation may cause a ground engaging tool to rotate to an unlocked position, resulting in the ground engaging tool coming unattached from the customized retainer system and the implements.

U.S. Patent Publication No. 2020/0378093 discloses a retainer sleeve for use with a lock in a ground engaging tool with a lock cavity, the lock having an outer surface and a detent recess. The retainer sleeve includes a skirt extending part way around a retainer axis, forming an inner surface shaped to rotatably receive the outer surface of the lock. The skirt includes a first plate, a second plate located proximate to the first plate, and a center bend circumferentially extending between the first plate and second plate with respect to the retainer axis. The retainer sleeve further includes a first leg joined to the first plate, extending away from the retainer axis, and formed to mate with the lock cavity of the ground engaging tool. The retainer sleeve further includes a second leg joined to the second plate, extending away from the retainer axis, and formed to mate with the lock cavity of the ground engaging tool.

The retainer sleeve of the present disclosure solves one or more of the problems set forth above and/or other problems in the art.

SUMMARY

In some implementations, a retainer sleeve for use with a lock in a ground engaging tool with a lock cavity includes a body including an at least partially annular configuration defining a retainer axis, the body including: an inner surface configured to rotatably receive an outer surface of the lock; a plurality of plates circumferentially joined together with respect to the retainer axis, wherein a first plate of the plurality of plates includes a first leg joined to the first plate extending away from the retainer axis and configured to contact the lock cavity; and an anti-rotation feature, disposed on the first plate, extending inward from the inner surface toward the retainer axis, the anti-rotation feature including a locking surface configured to contact a lock skirt of the lock, the locking surface disposed at a first angle with respect to a bottom end of the first plate.

In some implementations, a retainer sleeve for use with a lock in a ground engaging tool includes a plurality of plates joined together to form an annular shape around a retainer axis; an anti-rotation feature, disposed on an inner surface of a first plate of the plurality of plates, extending inward toward the retainer axis, the anti-rotation feature including a locking surface configured to prevent a rotation of the lock relative to the retainer axis, wherein the locking surface is disposed at a first angle relative to a bottom end of the first plate and the locking surface is substantially perpendicular to the inner surface of the first plate; and a detent projection extending from a side of a second plate of the plurality of plates configured to engage a detent recess of the lock to releasably hold the lock.

In some implementations, a retainer system for a ground engaging tool includes a lock including: a head portion having a tool interface; a lock skirt extending from the head portion and including an outer surface, the lock skirt including an angled surface; and a retainer sleeve including: a body including an at least partially annular configuration around a retainer axis; an anti-rotation feature, disposed on an inner surface of the body, extending inward toward the retainer axis, the anti-rotation feature including a locking surface configured to contact the angled surface of the lock skirt, wherein the locking surface is disposed at a first angle relative to a bottom end of the body, wherein the first angle substantially corresponds to the angled surface; and a plurality of legs extending from a top end of the body away from the retainer axis, wherein at least two legs of the plurality of legs have different lengths.

BRIEF DESCRIPTION OF THE DRAWINGS

FIG. 1 is a diagram of an example perspective view of a loader bucket having a plurality of ground engaging tools attached thereto described herein.

FIG. 2 is a diagram of an example an exploded perspective view of a tooth assembly described herein.

FIG. 10 is a front view of the plate with an anti-rotation feature described herein.

FIG. 11 is a cross section view of the plate with the anti-rotation feature described herein.

FIG. 12 is a top view of an assembly of the lock and the retainer sleeve described herein.

FIG. 13 is a cross section view of the assembly of the lock and the retainer sleeve described herein.

DETAILED DESCRIPTION

Figure 3:
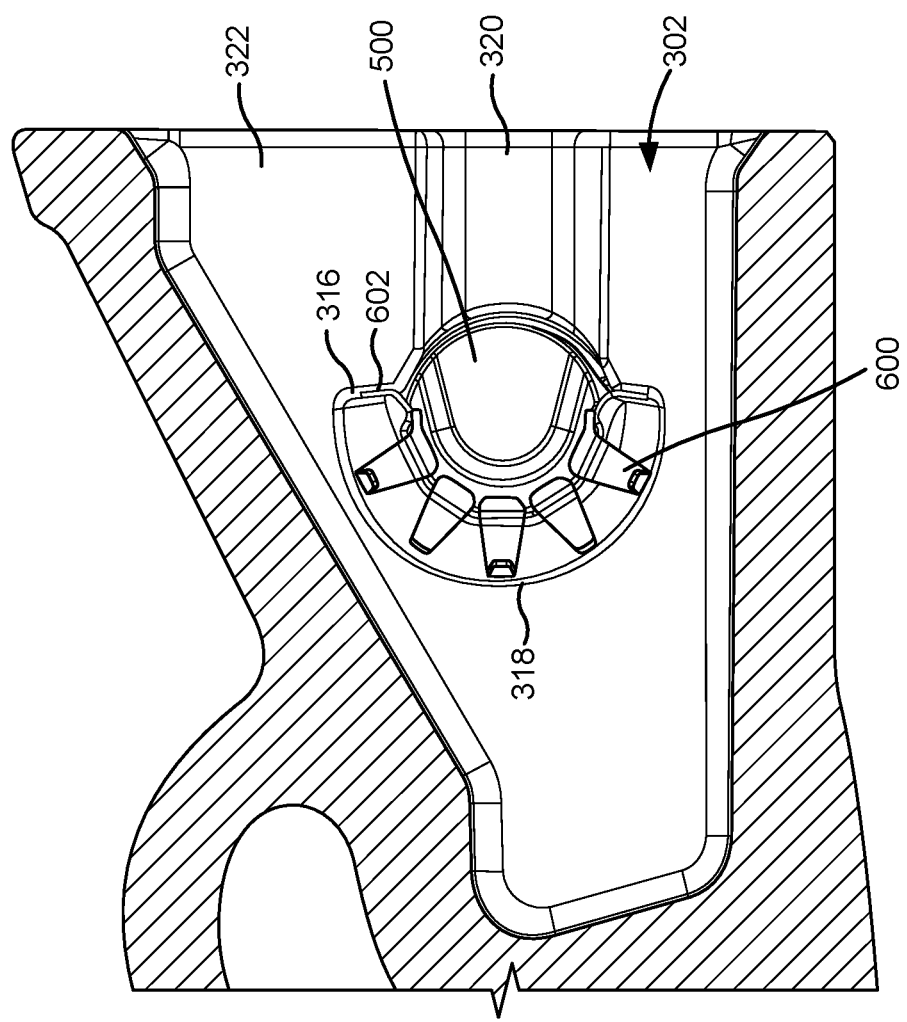
FIG. 3 is a diagram of an example a cross section of a portion of the tip of the tooth assembly described herein.

This disclosure relates to a retainer sleeve, which is applicable to any machine that includes a removable ground engaging tool. For example, the machine may be an excavator, a backhoe loader, a wheel loader, a hydraulic mining shovel, a cable shovel, a skid steer loader, a tractor, a bucket wheel, a bulldozer, and/or a dragline, among other examples.

FIG. 1 is a perspective view of a loader bucket having a plurality of ground engaging tools described herein. FIG. 1 illustrates an excavator bucket assembly 100 as an exemplary implement of an earth-working machine. The excavator bucket assembly 100 includes a bucket 102 used for excavating work material in a known manner. The bucket 102 may include a variety of ground engaging tools. For example, the bucket 102 may include a plurality of tooth assemblies 104, as ground engaging tools, attached to a base edge 106 of the bucket 102. The tooth assemblies 104 may be secured to the bucket 102 employing retainer systems described herein. While various embodiments of the present disclosure will be described in connection with a particular ground engaging tool (e.g., tooth assembly 104), retainer systems and retainer sleeves described herein may be applied to, or used in connection with, any other type of ground engaging tools or components. Further, one or more features described in connection with one embodiment may be implemented in any of the other disclosed embodiments unless otherwise specifically noted.

As indicated above, FIG. 1 is provided as an example. Other examples may differ from what was described in connection with FIG. 1.

FIG. 2 is an exploded perspective view of a tooth assembly 104 described herein. The tooth assembly 104 may include an adapter 200 configured to engage the base edge 106 of the bucket 102 or other suitable support structure of an implement. The tooth assembly 104 may also include a ground-engaging tip, or tip, 300 formed to be removably attached to the adapter 200. The tooth assembly 104 may further include a retainer system 400 formed to secure the tip 300 to the adapter 200. The tip 300 endures the majority of the impact and abrasion caused by engagement with work material and wears down more quickly and breaks more frequently than the adapter 200. Consequently, multiple tips 300 may be attached to the adapter 200, worn down, and replaced before the adapter 200 itself needs to be replaced. As described in more detail herein, various exemplary embodiments of the retainer system 400, consistent with the present disclosure, may facilitate attachment of ground engaging tools and tips 300 to and from the adapter 200 attached to an implement.

The adapter 200 may include a first mounting leg 202 and a second mounting leg 204 defining a recess 206 therebetween for receiving the base edge 106. The adapter 200 may be secured in place on the base edge 106 by attaching the first mounting leg 202 and the second mounting leg 204 to the base edge 106 using any suitable connection method. For example, the mounting legs 202 and 204 and the base edge 106 may have corresponding apertures (not shown) through which any suitable fasteners such as bolts or rivets may be inserted to hold the adapter 200 in place. Additionally, or alternatively, the mounting legs 202 and 204 may be welded to the corresponding top and bottom surfaces of the base edge 106. Any other connection method and/or configuration known in the art may be used. For example, in some exemplary embodiments, an adapter 200 may be configured to use any of the retainer systems 400 described herein to secure the adapter 200 to a ground engaging tip 300.

The adapter 200 may include a nose 208 extending in a forward direction. Nose 208 may be configured to be received in a mounting cavity 302 (shown in FIG. 3) of tip 300. Nose 208 may be configured to support the tip 300 during use of the bucket 102 and to facilitate retention of the tip 300 on the nose 208 when bearing the load of the work material.

The nose 208 may include an integral post 210 extending from each lateral side 212 and 214. The post 210 may have various shapes and sizes. In one exemplary embodiment, as shown in FIG. 2, the post 210 may have a frustoconical shape. As described in more detail herein, the posts 210 may cooperate with the retainer system 400 to secure the tip 300 to the adapter 200.

The tip 300 may have various outer shapes. For example, the tip 300 may generally taper as it extends forward. An upper surface 304 of the tip 300 may slope downward as it extends forward, and a lower surface 306 of the tip 300 may extend generally upward as it extends forward. Alternatively, the lower surface 306 may extend generally straight or downward as it extends forward. At a forward end of the tip 300, the tip 300 may have a wedge-shaped edge 308.

The tip 300 may be secured to the adapter 200 via the retainer system 400. The retainer system 400 may include a lock 500 and a retainer sleeve 600. The tip 300 and/or the adapter 200 may have various configurations for accommodating the lock 500 and the retainer sleeve 600 therein. For example, the tip 300 may include a lock cavity 310 in lateral sides 312 (or in each lateral side 312 of the tip 300) for housing the lock 500 and retainer sleeve 600. The lock 500 and the retainer sleeve 600 may be seated within the lock cavity 310 when assembled to the tip 300. The tip 300 may also include a lock bulge 314 extending outward of each lock cavity 310. The lock cavity 310 may include a shoulder 316 extending adjacent the circumferential outer ends of the lock cavity 310. While the exemplary embodiment shown in FIG. 2 has the lock cavity 310 and the lock bulge 314 on each lateral side 312 of the tip 300, the tip 300 may have different numbers and/or arrangements of lock cavities 310 and lock bulges 314.

As indicated above, FIG. 2 is provided as an example. Other examples may differ from what was described in connection with FIG. 2.

FIG. 3 is a cross section of a portion of the tip of the tooth assembly 104 shown in FIG. 2, with a lock 500 and a retainer sleeve 600 positioned in a lock cavity 310 of the tip 300 described herein. The tip 300 may define the mounting cavity 302 inside the tip 300 having a complementary configuration relative to the nose 208 of the adapter 200. The tip 300 and/or the adapter 200 may have various configurations for accommodating the lock 500 and the retainer sleeve 600 therein. For example, the lock 500 and the retainer sleeve 600 may be seated within the lock cavity 310 when assembled to the tip 300.

The lock 500 and the retainer sleeve 600 may be configured to fit within an inner surface 318 of the lock cavity 310 in a manner allowing the lock 500 to rotate at least partially around a lock rotation axis 502 (not shown in FIG. 3) relative to the retainer sleeve 600. The retainer sleeve 600 may sit directly against the inner surface 318 of the lock cavity 310, and the lock 500 may sit against an inner surface 602 (shown in FIG. 7) of the retainer sleeve 600. On a rear side of the lock cavity 310, the lock cavity 310 may open into a side slot 320 that extends rearward from the lock cavity 310 along an inner surface 322 of the lateral side 312. The side slot 320 may have a cross-section configured to allow passage of at least a portion of the post 210 of the adapter 200 being inserted from the rear end of the tip 300.

As indicated above, FIG. 3 is provided as an example. Other examples may differ from what was described in connection with FIG. 3.

Figure 4:
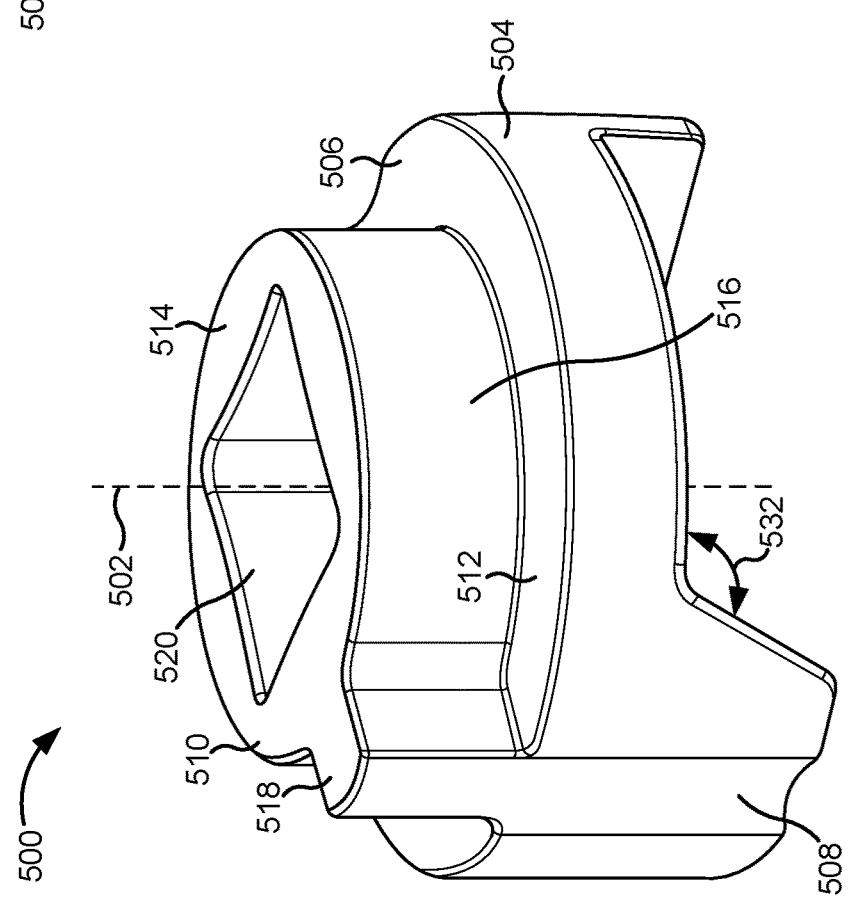
FIG. 4 is a top perspective view of a lock of the retainer system described herein.

FIG. 4 is a top perspective view of the lock 500 of the retainer system 400 described herein. The lock 500 may include a lock skirt 504 with an outer surface 506 that may extend circumferentially around and concentric with the lock rotation axis 502. The lock skirt 504 may be substantially cylindrically shaped or conically shaped. The lock skirt 504 may have a detent recess 508 that may extend radially inward from the outer surface 506 of the lock skirt 504. The detent recesses 508 may include a concave surface, such as a constant-radius curved surface, extending radially inward from the outer surface 506.

The lock 500 may include a head portion 510 attached to the lock skirt 504 adjacent to an end of the lock skirt 504. The head portion 510 may include a wall 512 extending in a plane substantially perpendicular to the lock rotation axis 502 and across the end of the lock skirt 504 adjacent to the head portion 510. The head portion 510 may include a projection 514 extending from the wall 512 away from the lock skirt 504 along the lock rotation axis 502. The projection 514 may include a substantially cylindrical outer surface 516 extending around most of the lock rotation axis 502 and a lock tab 518 extending radially outward relative to the lock rotation axis 502. The lock 500 may include a tool interface 520 in the head portion 510 to facilitate rotating the lock 500 about the lock rotation axis 502. The tool interface 520 may include any type of features formed to be engaged by a tool for applying torque to the lock 500 about the lock rotation axis 502. The lock cavity 310 may provide an access opening for a tool to engage the tool interface 520.

As indicated above, FIG. 4 is provided as an example. Other examples may differ from what was described in connection with FIG. 4.

Figure 5:
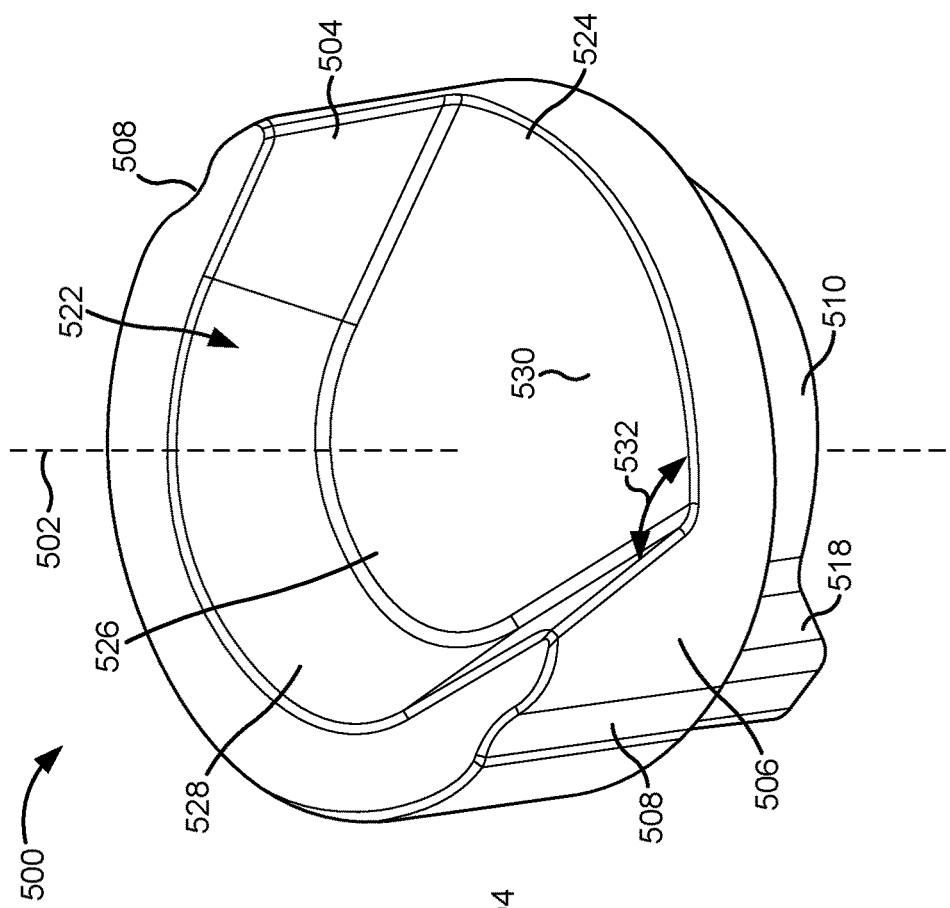
FIG. 5 is a bottom perspective view of the lock described herein.

FIG. 5 is a bottom perspective view of the lock 500 described herein. The lock 500 may be configured to receive at least part of the post 210 of the adapter 200. The lock 500 may include a lock slot 522 extending into the lock skirt 504. The lock slot 522 may have an open end 524 between two circumferential ends of the lock skirt 504 and a closed end 526 adjacent to a middle portion of the lock skirt 504. The lock slot 522 may have a size and shape such that the lock skirt 504 is configured to receive the post 210. An inner surface 528 of the lock skirt 504 may be sloped so as to mate with the post 210 adjacent to the closed end 526 of the lock slot 522.

In some implementations, the wall 512 may fully enclose the side of the lock slot 522 adjacent to the head portion 510. The side of the head portion 510 opposite the lock slot 522 may include the projection 514 extending from the wall 512. The lock tab 518 may extend transverse relative to the direction that the lock slot 522 extends from the open end 524 to the closed end 526. In some implementations, at least one of (or both of) the circumferential ends of the lock skirt 504 may be angled with respect to a surface 530 of the lock slot 522. For example, a circumferential end of the lock skirt 504 may extend from the surface 530 at an angle 532. For example, the inner surface 528 of the lock skirt 504 may be sloped at the angle 532 (e.g., so as to mate with the post 210). The angle 532 may be from 105 degrees to 125 degrees.

As indicated above, FIG. 5 is provided as an example. Other examples may differ from what was described in connection with FIG. 5.

Figure 6:
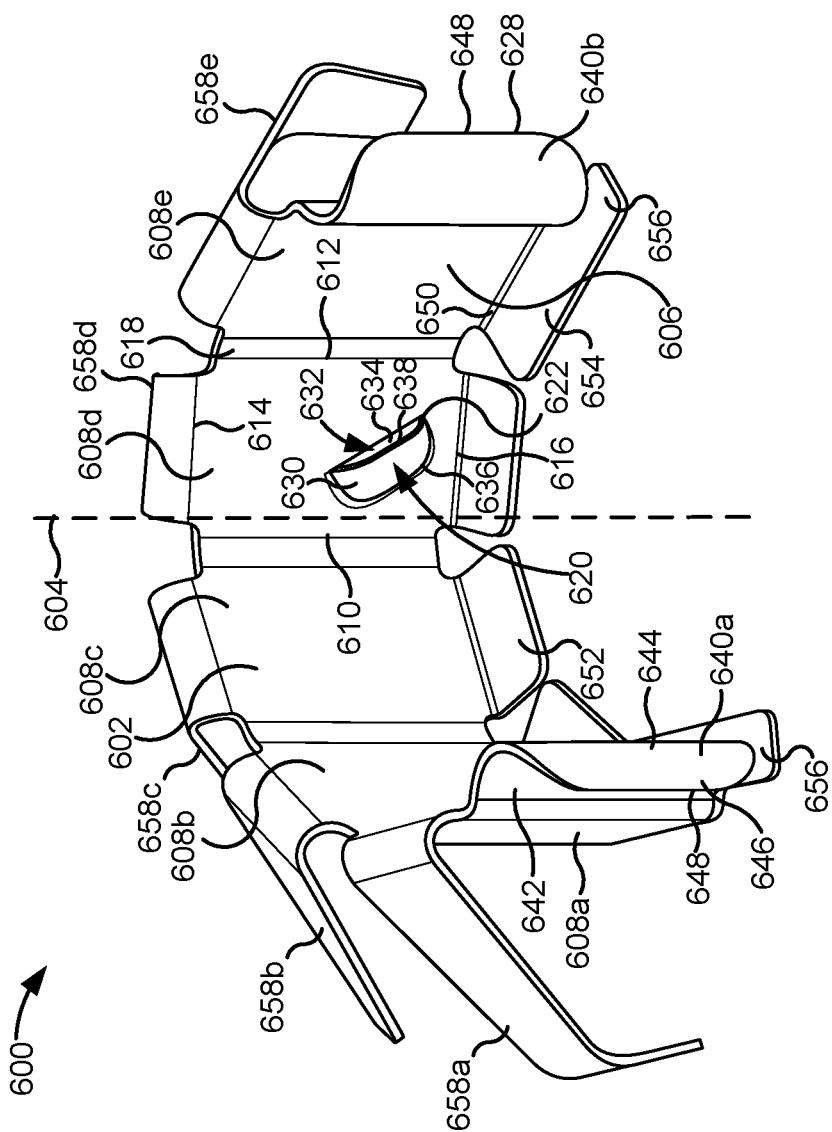
FIG. 6 is a front perspective view of a retainer sleeve described herein.

FIG. 6 is a front perspective view of the retainer sleeve 600 described herein. Several of the elements shown are commonly shared elements and to improve the clarity and readability some of the reference numbers are not shown here and in other figures. The retainer sleeve 600 may have an at least partially annular configuration, defining a retainer axis 604. For example, the retainer sleeve 600 may be generally "C" shaped. The retainer sleeve 600 may include a body 606 extending along the entire "C" which may be circumferentially around, and concentric with, the retainer axis 604. Therefore, the body 606 may extend circumferentially around and concentric with the lock rotation axis 502 (shown in FIGS. 4 and 5) when the retainer sleeve 600 is assembled with the lock 500 in the lock cavity 310. The body 606 may form an annular shape, or a continuous "C" shape, that extends part way around the retainer axis 604. The body 606 may extend 180 degrees or more around the retainer axis 604. In some examples, the body 606 may extend approximately the same angular degree around the retainer axis 604 as the inner surface 322 of the lock cavity 310 extends around the lock rotation axis 502. The body 606 may be configured to receive the lock 500.

The body 606 may include a plurality of plates, such a first plate 608a, a second plate 608b, a third plate 608c, a fourth plate 608d, and a fifth plate 608e. In one implementation, there may be five plates 608a-e. However, in other implementations, there may be one, two, three, four, five, six, seven, or more plates. Each plate of the plurality of plates 608a-e may be substantially parallel to the retainer axis 604. Alternatively, each plate of the plurality of plates 608a-e may be angled toward the retainer axis 604 or away from the retainer axis 604. The plurality of plates 608a-e may form the inner surface 602 (shown pointing to the third plate 608c) or form a portion of the inner surface 602. Each of the plurality of plates 608a-e may have a flat shape and may be generally rectangular. Alternatively, each of the plurality of plates 608a-e may have a curved shape. Each of the plurality of plates 608a-e may include lower recesses and upper recesses to form a rectangle with concave curves at the corners of the rectangle (e.g., to provide stress relief during the manufacture and forming process of the retainer sleeve 600).

A plate (shown with the fourth plate 608d in FIG. 6) may include a first side 610, a second side 612, a top end 614, and a bottom end 616 that form the sides of a generally rectangular shape of the fourth plate 608d. The descriptions directed at the first side 610, the second side 612, the top end 614, and the bottom end 616 for the fourth plate 608d may be similarly used for the descriptions of a first side 610, a second side 612, a top end 614, and a bottom end 616 for the first plate 608a, second plate 608b, third plate 608c, and/or fifth plate 608e.

The plurality of plates 608a-e may be joined together (e.g., circumferentially joined together) in an at least partially annular configuration (e.g., the plurality of plurality of plates 608a-e may be joined together to be generally "C" shaped). For example, the first side 610 of the second plate 608b may extend from the second side 612 of the first plate 608a. The plurality of plates 608a-e may each be joined by a center bend 618 (only shown between the fourth plate 608d and the fifth plate 608e for clarity). The center bend 618 may circumferentially extended between at least one of the plurality of plates 608a-e to another of the plurality of plates 608a-e. The center bend 618 may be generally curved and extend generally parallel with the plurality of plates 608a-e and the retainer axis 604. The center bend(s) 618 may join the plurality of plates 608a-e together to form a substantially solid and/or continuous body 606 (e.g., in an at least partially annular configuration about the retainer axis 604).

The retainer sleeve 600 may include an anti-rotation feature 620. The anti-rotation feature may be disposed on the body 606 of the retainer sleeve 600. For example, the anti-rotation feature 620 may be disposed on a first plate of the plurality of plates 608a-e (shown as the fourth plate 608d in FIG. 6). For example, the anti-rotation feature 620 may be disposed on a plate, of the plurality of plates 608a-e, that is adjacent to two plates of the plurality of plates 608a-e. In other words, the anti-rotation feature 620 may be disposed on any plate 608b-d (e.g., but not the first plate 608a or the fifth plate 608e). Alternatively, the anti-rotation feature 620 may be disposed on the first plate 608a or the fifth plate 608e. The anti-rotation feature 620 may extend inward from the inner surface 602 of the body 606 toward the retainer axis 604. While only one anti-rotation feature 620 is depicted and described herein, the retainer sleeve 600 may include multiple anti-rotation features 620.

The anti-rotation feature 620 may include a locking surface 622. The locking surface 622 may be configured to contact the lock skirt 504 of the lock 500 (e.g., if the lock 500 rotates about the lock rotation axis 502 when the retainer sleeve 600 is assembled with the lock 500 in the lock cavity 310, as described in more detail elsewhere herein). The locking surface 622 may be a substantially flat surface (e.g., to prevent the lock 500 from rotating past the anti-rotation feature 620 about the lock rotation axis 502). Alternatively, the locking surface 622 may be an at least partially curved surface. The locking surface may be substantially perpendicular to the inner surface 602 of the body 606 (e.g., and the fourth plate 608d). For example, the locking surface 622 may be a substantially flat surface and/or may be substantially perpendicular to the inner surface 602 to ensure that the lock 500 is unable to rotate past the anti-rotation feature 620 about the lock rotation axis 502 without a significant amount of force or torque being applied to the lock 500. The locking surface 622 may face a radial end 628 of the body 606.

The locking surface 622 may be disposed at a first angle 624 (shown in FIG. 10) relative to the bottom end 616 of the fourth plate 608d. The locking surface 622 may be radially disposed at a second angle 626 (shown in FIG. 8) with respect to the radial end 628 of the body 606 and the retainer axis 604. A size of the second angle 626 may substantially correspond to an amount of rotation that would cause the lock 500, when rotated about the lock rotation axis 502, to move into an unlocked position. In other words, the size of the second angle 626 may be less than the amount of rotation that would cause the lock 500, when rotated about the lock rotation axis 502, to move into an unlocked position.

The anti-rotation feature 620 may include a shell 630. The shell 630 may define a body of the anti-rotation feature 620. The shell 630 may define a cavity 632 (e.g., a cave) between the shell 630 and the inner surface 602. A thickness of the shell 630 may substantially correspond to a thickness of the plurality of plates 608a-e. The locking surface 622 may include a first aperture 634 to the cavity 632. Alternatively, the locking surface 622 may be a solid surface. The locking surface 622 may have different shapes and/or geometries. For example, as shown in FIG. 6, the locking surface may include a first curve and a second curve extending away from the inner surface 602. The first curve and the second curve may have the same radius or may have different radii.

The first curve and the second curve may join with a flat edge to form the shape of the locking surface 622. Alternatively, the locking surface 622 may not have any curves (e.g., may have a rectangular shape or a square shape).

The shell 630 of the anti-rotation feature 620 may have different shapes and/or geometries. For example, as shown in FIG. 6, the shell 630 may slope from the locking surface 622 to the inner surface 602. In some examples, the shell 630 may include at least one curved edge 636 and at least one flat edge 638. The curved edge 636 may include one or more bends. In some examples, as shown in FIG. 6, the curved edge 636 may include two bends. The curved edge 636 may include bends and have the same radius and/or bends having different radii. The locking surface 622 may define the flat edge 638. For example, the shell 630 may have a substantially "D" shape. Other shapes and geometries of the shell 630 are possible. For example, the shell 630 may not have any curved edges 636 and may be rectangular in shape.

The body 606 may include one or more detent projections 640a and 640b for engaging corresponding detent recesses 508 of the lock 500. The body 606 may include detent projections 640a and 640b extending circumferentially from the first plate 608a and the fifth plate 608e. Detent projections 640a and 640b may be located at various positions on the retainer sleeve 600. For example, detent projections 640a and 640b may be spaced approximately 180 degrees from one another around the retainer axis 604 at opposite ends of the "C" shaped retainer sleeve 600.

Detent projections 640a and 640b may have various shapes. In one exemplary embodiment, each detent projection 640a and 640b may include a detent first portion 642, a detent second portion 644, and a detent third portion 646 (only shown on detent projection 640a in FIG. 6 for clarity). Alternatively, the detent projections 640a and 640b may have a single portion with a curvature of a constant radius. The detent first portion 642 may extend from the first plate 608a or the fifth plate 608e and have a concave shape relative to the retainer axis 604. Alternatively, the detent first portion 642 may be straight, have a convex shape or may have a varying curvature with multiple radii. The detent second portion 644 may extend from the detent first portion 642 and have a convex shape relative to the retainer axis 604. Alternatively, the detent second portion 644 may be straight and have a concave surface or may have a varying curvature with multiple radii. The detent third portion 646 may extend from the detent second portion 644, opposite from the detent first portion 642. The detent third portion 646 may have a concave surface or convex surface with respect to the retainer axis 604 and have a constant curvature or varying curvature. The detent projections 640a and 640b may include detent ends 648 that are spaced from each other at the circumferential opposite ends of the body 606 and are at ends of the detent third portions 646.

The retainer sleeve 600 may include a first bend 650 (only shown with fifth plate 608e for clarity) extending from each of the bottom ends 616 of the plurality of plates 608a-e. The first bend 650 may flexibly extend inward and be generally transverse from at least one of the plurality of plates 608a-e with respect to the retainer axis 604. The first bend 650 may be shaped to transition from being oriented generally parallel with at least one of the plurality of plates 608a-e to being generally transverse to at least one of the plurality of plates 608a-e.

The retainer sleeve 600 may include a central tab 652 (only shown proximate to the third plate 608c for clarity) extending from at least one of the plurality of plates 608a-e. The central tab 652 may extend from the first bend 650. The central tab 652 may extend generally parallel from first bend 650 inward toward the retainer axis 604. The central tab 652 may have a "D" shape with the straight side joined to the first bend 650 or the bottom end 616 of at least one of the plurality of plates 608a-e and the curved side located opposite of the straight side. The retainer sleeve 600 may include multiple central tabs 652.

The retainer sleeve 600 may include an end tab 654 (only shown proximate to fifth plate 608e for clarity) or multiple end tabs 654 disposed proximate to one of the detent ends 648 and extending from the first bend 650. The end tab 654 may extend from the bottom end 616 of at least one of the plurality of plates 608a-e. The end tab 654 may extend generally parallel from first bend 650 inward toward the retainer axis 604. The end tabs 654 may include protrusions 656 that may extend generally parallel and circumferentially away from the central tabs 652. The protrusions 656 may provide additional engagement with the lock skirt 504 of the lock 500 while the lock 500 is in a locked position. The central tabs 652 may be positioned circumferentially between the end tabs 654.

The retainer sleeve 600 may include a plurality of legs 658a-e. For example, the plurality of legs 658a-e may include a first leg 658a, a second leg 658b, a third leg 658c, a fourth leg 658d, and a fifth leg 658e. For example, each leg 658a-e may extend from a plate of the plurality of plates 608a-e. The legs 658a-e are described in more detail in connection with FIGS. 7 and 9.

As indicated above, FIG. 6 is provided as an example. Other examples may differ from what was described in connection with FIG. 6.

Figure 7:
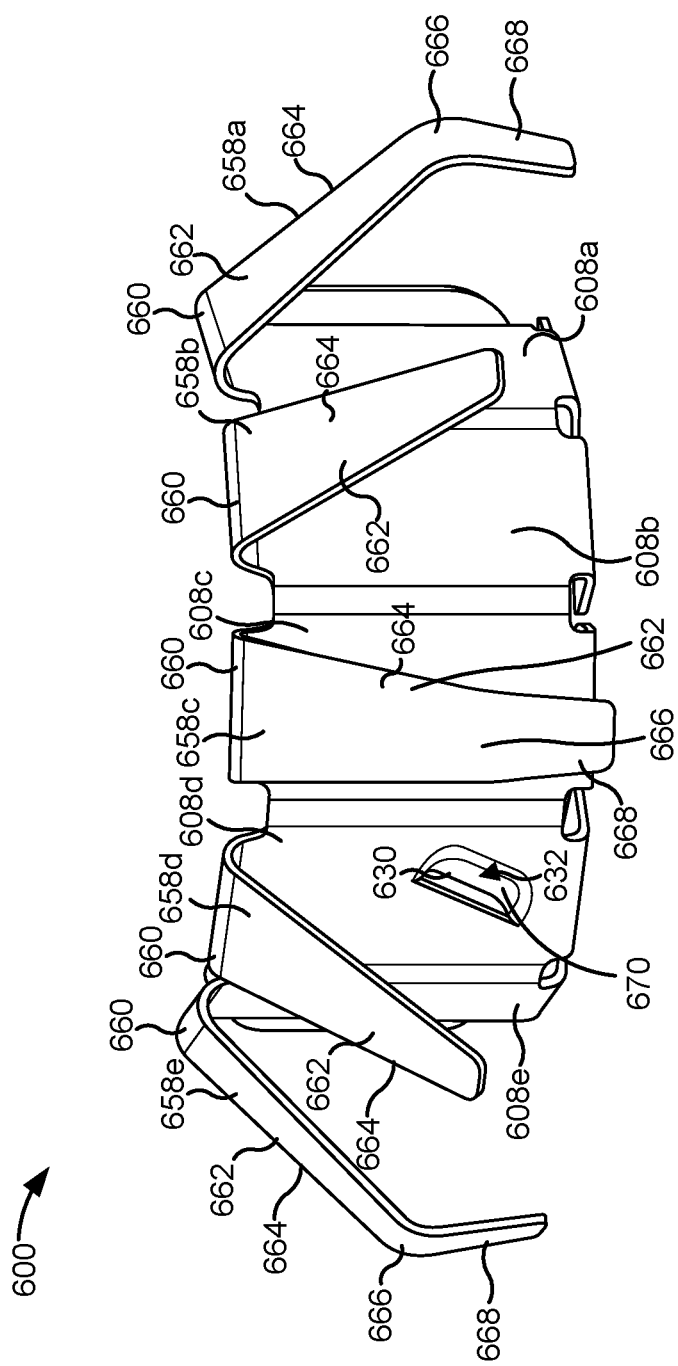
FIG. 7 is a rear perspective view of the retainer sleeve described herein.

FIG. 7 is a rear perspective view of the retainer sleeve 600 described herein. As shown in FIG. 7, each of the legs 658a-e may include a second bend 660. As shown in FIG. 7, the retainer sleeve 600 may include five legs. Alternatively, the retainer sleeve 600 may include two, three, four, six, seven, or more legs 658a-e. A number of legs 658a-e may correspond to a number of the plurality of plates 608a-e.

Each of the legs 658a-e may include outer surfaces 662 which collectively form a segmented frustoconical surface generally configured into a segmented "C" shape (or a segmented annular configuration). The legs 658a-e may be formed for engagement in the lock cavity 310 of the tip 300. The legs 658a-e may be flexibly joined to the body 606 such that the retainer sleeve 600 is compressible for insertion into the lock cavity 310 and expandable when the retainer sleeve 600 is assembled inside the lock cavity 310.

The first leg 658a, the third leg 658c, and the fifth leg 658e may include a second bend 660, a first extension 664, a third bend 666, and a second extension 668. Each leg 658a-e may be similarly shaped, with the differences in shape related to a third bend 666 and the second extension 668 being included on one or more of the legs, such as the first leg 658a, the third leg 658c, and/or the fifth leg 658e (e.g., and not included on one or more other legs). For example, every other leg of the legs 658a-e may include a third bend 666 and a second extension 668. Alternatively, each of (or none of) the legs 658a-e may include a third bend 666 and a second extension 668. For example, legs 658a-e that include the second extension 668 may have a different length than a leg 658a-e that does not include the second extension 668.

The third bend 666 may flexibly extend from the first extension 664. The third bend 666 may transition from oriented outwards to oriented inwards, with respect to the retainer axis 604. The third bend 666 may have a constant radius that may be from 0.5 millimeters (mm) to 6.0 mm. The third bend 666 may transition from the first extension 664 to the second extension 668 at an angle. The angle may be from 40 degrees to 110 degrees with respect to the first extension 664. The second extension 668 may extend downward and inward from the third bend 666 with respect to the retainer axis 604. The second extension 668 may extend from the first extension 664 opposite from the first plate 608a. The first extension 664 may taper from wider proximate the third bend 666 or first plate 608a to narrower proximate an end of second extension 668.

The body 606 of the retainer sleeve 600 may include a second aperture 670. For example, the fourth plate 608d may include the second aperture 670. In other words, the plate of the plurality of plates 608a-e that includes the anti-rotation feature 620 may include the second aperture 670. The second aperture 670 may define a second opening to the cavity 632 defined by the shell 630 of the anti-rotation feature 620. A shape of the second aperture 670 may correspond to a shape of the shell 630 of the anti-rotation feature 620. For example, the second aperture 670 may have a substantially "D" shape, with a flat edge and a curved edge. Alternatively, the second aperture 670 may not have any curved edges (e.g., may be rectangular in shape). For example, the anti-rotation feature 620 may be a louver formed from the fourth plate 608d, such that the first aperture 634 and the second aperture 670 provide openings to the cavity 632 defined by the shell 630 of the anti-rotation feature 620. In some examples, the anti-rotation feature 620 may be a punch from the fourth plate 608d. The first aperture 634 and the second aperture 670 may define a passage or hole through the fourth plate 608d.

As indicated above, FIG. 7 is provided as an example. Other examples may differ from what was described in connection with FIG. 7.

Figure 8:
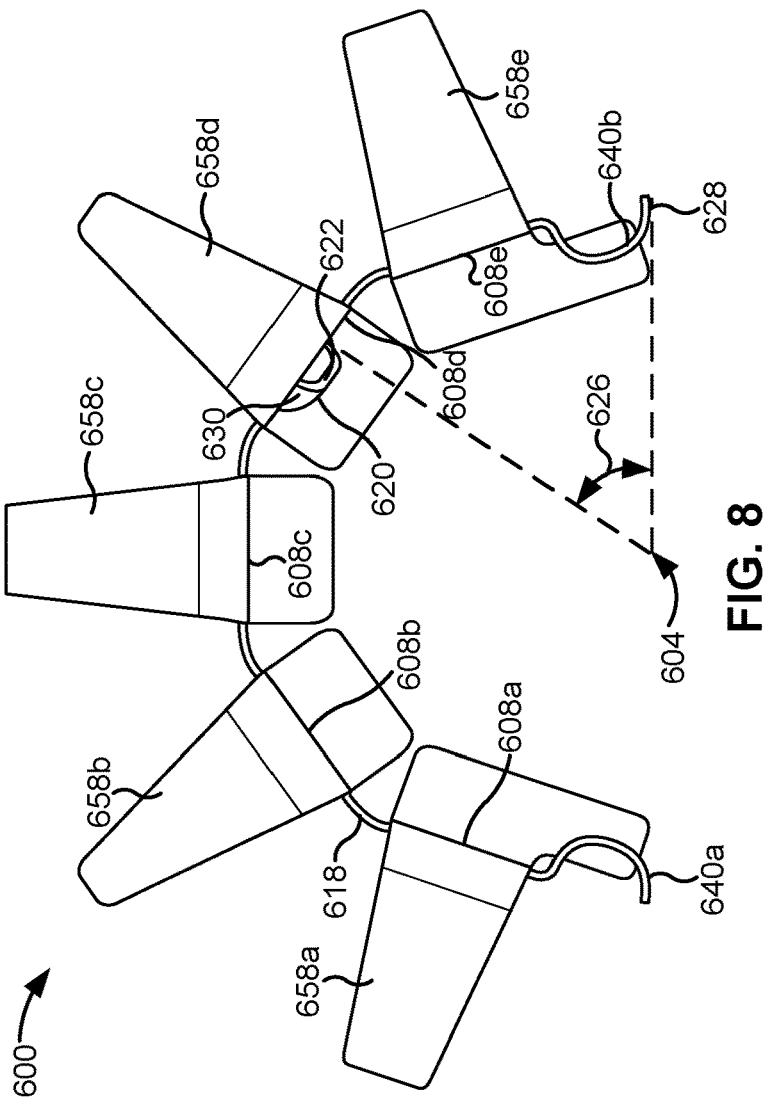
FIG. 8 is a top view of the retainer sleeve described herein.

FIG. 8 is a top view of the retainer sleeve 600 described herein. As shown in FIG. 8, the retainer sleeve 600 may have a substantially annular shape around the retainer axis 604. For example, the retainer sleeve 600 may form a "C" shape around the retainer axis 604. The retainer sleeve 600 may form the substantially annular shape via the center bend(s) 618 that join the plurality of plates 608a-e together.

The anti-rotation feature 620 may be radially disposed at the second angle 626 with respect to the radial end 628 (e.g., and/or a detent projection 640a or 640b) of the body 606 and the retainer axis 604. For example, the locking surface 622 (e.g., a front radial edge of the locking surface 622) may be disposed at the second angle 626 with respect to the radial end 628 (e.g., and/or a detent projection 640a or 640b) of the body 606 and the retainer axis 604. A size of the second angle 626 may substantially correspond to an amount of rotation that would cause the lock 500, when rotated about the lock rotation axis 502, to move into an unlocked position. In other words, the size of the second angle 626 may be less than the amount of rotation that would cause the lock 500, when rotated about the lock rotation axis 502, to move into an unlocked position. For example, the second angle 626 may be from 30 degrees to 37.5 degrees.

As indicated above, FIG. 8 is provided as an example. Other examples may differ from what was described in connection with FIG. 8.

Figure 9:
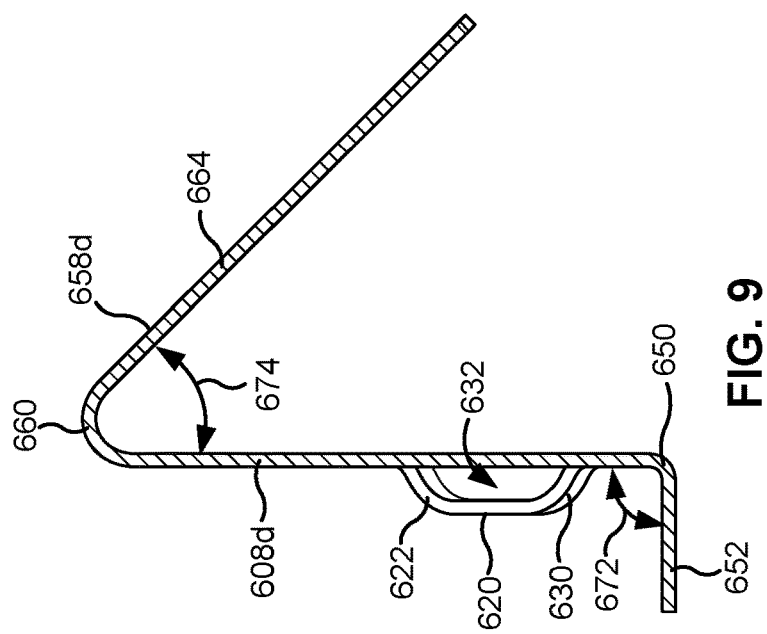
FIG. 9 is a cross section view of a central tab, a plate, and a leg described herein.

FIG. 9 is a cross section view of the central tab 652, the fourth plate 608d, and the fourth leg 658d described herein. The second leg 658b may be shaped similar to the fourth leg 658d, and the similar features described in connection with the fourth leg 658d may be used for the features of the second leg 658b.

The first bend 650 may transition from the central tab 652 to the bottom end 616 of the fourth plate 608d at a third angle 672. The third angle 672 may be from 85 degrees to 90 degrees from the fourth plate 608d. The second bend 660 may flexibly extend from the top end 614 of the fourth plate 608d, opposite the first bend 650. The second bend 660 may extend outward with respect to the retainer axis 604. The second bend 660 may be formed with a constant radius that may be from 0.5 mm to 6.0 mm. The second bend 660 may transition from the fourth plate 608d to the first extension 664 at a fourth angle 674. The fourth angle 674 may be from 20 degrees to 50 degrees from the fourth plate 608d.

The first extension 664 may extend away from the second bend 660 or the fourth plate 608d and outward from the second bend 660 or the fourth plate 608d with respect to the retainer axis 604. The first extension 664 may taper from wider proximate the second bend 660 or the fourth plate 608d to narrower opposite the fourth plate 608d or proximate an end of the first extension 664. For example, the taper may be from 5 degrees to 10 degrees. The first extension 664 may have a curvature of constant radius, such as a radius from 60 mm to 65 mm. The first extension 664 may have a concave curvature with respect to the fourth plate 608d. In another example, the first extension 664 may be straight or have a varying curvature.

As shown in FIG. 9, the anti-rotation feature 620 may extend from the fourth plate 608d (or the inner surface 602 of the retainer sleeve 600) toward the retainer axis 604. For example, the anti-rotation feature 620 may extend from 2 mm to 5 mm from the fourth plate 608d (or the inner surface 602 of the retainer sleeve 600).

As indicated above, FIG. 9 is provided as an example. Other examples may differ from what was described in connection with FIG. 9.

FIG. 10 is a front view of the fourth plate 608d with the anti-rotation feature 620 described herein. FIG. 10 shows a cutaway front view of the retainer sleeve 600, showing only the fourth plate 608d and a portion of the fifth plate 608e for clarity.

The locking surface 622 of the anti-rotation feature 620 may be disposed at the first angle 624 relative to the bottom end 616 of the fourth plate 608d. The first angle 624 may be from 20 degrees to 35 degrees. In some implementations, the first angle 624 may be approximately 27.5 degrees. The first angle 624 may substantially correspond to the angle 532 of the lock skirt 504 of the lock 500. For example, the first angle 624 and the angle 532 may be supplementary angles (such that a sum of the first angle 624 and the angle 532 is approximately 180 degrees). This may enable an increased locking surface area when the locking surface 622 contacts a circumferential end of the lock skirt 504 (e.g., a surface area of the locking surface 622 that contacts the circumferential end of the lock skirt 504 may be larger because the first angle 624 and the angle 532 are approximately supplementary angles). Alternatively, the first angle 624 may be larger than 35 degrees. For example, the locking surface 622 of the anti-rotation feature 620 may be substantially perpendicular to the bottom end 616 of the fourth plate 608d.

The shell 630 of the anti-rotation feature 620 may include one or more curved edges 636. The one or more curved edges 636 may have a constant radius or may have varying radii. The one or more curved edges 636 may have a constant radius from 0.5 mm to 2 mm. The shell 630 may have a depth 676 and a width 678. The depth 676 may be from 3 mm to 8 mm. The width 678 may define a length of the locking surface 622. The width 678 may be from 5 mm to 11 mm. The depth 676 and/or the width 678 may be a function, or may depend on, a size of the retainer sleeve 600 and/or a size of the lock 500.

The anti-rotation feature 620 may be disposed at a first distance 680 from the bottom end 616 of the fourth plate 608d. The first distance 680 may be from 0.5 mm to 4 mm. The anti-rotation feature 620 may be disposed approximately in the center of the fourth plate 608d with respect to the first side 610 and the second side 612. For example, the anti-rotation feature 620 may be disposed at a second distance 682 from the second side 612 of the fourth plate 608d. The second distance 682 may be from 1.5 mm to 4.5 mm.

As indicated above, FIG. 10 is provided as an example. Other examples may differ from what was described in connection with FIG. 10.

FIG. 11 is a cross section view of the fourth plate 608d with the anti-rotation feature 620 described herein. For example, the cross section view of the fourth plate may be from a plane A-A shown in FIG. 10.

As shown in FIG. 11, the locking surface 622 of the anti-rotation feature 620 may be substantially flat and/or perpendicular to the inner surface 602 of the retainer sleeve 600. As a result, the anti-rotation feature may be configured to prevent a rotation of the lock 500 with respect to the lock rotation axis 502 because the lock 500 may rotate past the anti-rotation feature 620 only if the anti-rotation feature 620 fails (e.g., the flat and/or perpendicular locking surface 622 may not allow the lock 500 to rotate past the anti-rotation feature 620 unless enough torque is applied to the lock 500 to cause the anti-rotation feature 620 to fail).

The anti-rotation feature 620 may be a louver or a punch from the fourth plate 608d. For example, the anti-rotation feature 620 may include the first aperture 634 in the locking surface 622 and the second aperture 670 in the body 606 and/or in the fourth plate 608d of the retainer sleeve 600. The anti-rotation feature 620 may define an opening or a passage through the fourth plate 608d (e.g., from a back side of the fourth plate 608d to the inner surface 602 of the retainer sleeve 600). The anti-rotation feature 620 may include the shell 630 that defines the cavity 632. The shell 630 and/or the locking surface 622 may extend away from the inner surface 602 towards the retainer axis 604. For example, the shell 630 and/or the locking surface 622 may extend from 2 mm to 5 mm away from the inner surface 602.

The shell 630 may have a thickness that substantially corresponds to a thickness of the fourth plate 608d. For example, the shell 630 may extend from the fourth plate 608d. For example, the shell 630 may extend from the inner surface 602 of the fourth plate 608d to the locking surface 622. As shown in FIG. 11, the shell 630 may be sloped. For example, the shell 630 may include at least one bend. As shown in FIG. 11, the shell 630 may include a fourth bend 684 and a fifth bend 686. The fourth bend 684 may extend from the fourth plate 608d. The fourth bend 684 may be a convex bend with respect to the retainer axis 604. The fourth bend 684 may have a constant radius that may be from 0.5 mm to 2.0 mm. The fifth bend 686 may extend from the fourth bend 684 to the locking surface 622 (or to a flat section of the shell 630). The fourth bend 684 may be a concave bend with respect to the retainer axis 604. The fourth bend 684 may have a constant radius that may be from 0.5 mm to 2.0 mm. Alternatively, the shell 630 may include a single bend or no bends. For example, the shell 630 may be rectangular in shape, rather than sloping or curved in shape.

As indicated above, FIG. 11 is provided as an example. Other examples may differ from what was described in connection with FIG. 11.

FIG. 12 is a top view of an assembly of the lock 500 and the retainer sleeve 600 described herein. FIG. 12 depicts the lock 500 in a locked position. The body 606 of the retainer sleeve 600 may include a continuous inner surface 602 facing toward the retainer axis 604. The inner surface 602 may be formed by the plurality of plates 608a-e and center bend(s) 618. The lock 500 may be configured to mate with the inner surface 602. For example, as shown in FIGS. 4 and 5, the lock 500 may include a lock skirt 504 with an outer surface 506 having substantially the same profile as the inner surface 602 of the retainer sleeve 600. The outer surface 506 may be concentric with and/or extend circumferentially around the lock rotation axis 502. The lock skirt 504 and the outer surface 506 may extend only partway around the lock rotation axis 502. The lock 500 may be configured within the retainer sleeve 600 with the outer surface 506 of the lock 500 mated to the inner surface 602 of the retainer sleeve 600. When the lock 500 is positioned within the retainer sleeve 600, the lock rotation axis 502 may coincide with the retainer axis 604.

The lock 500 may include the one or more detent recesses 508 configured to engage corresponding detent projections 640a and 640b of the retainer sleeve 600 to releasably hold the lock 500 in predetermined rotational positions about the lock rotation axis 502 (e.g., in the locked position). The detent recesses 508 may have a shape configured to mate with the detent projections 640a and 640b. Accordingly, the lock 500 may be positioned in the retainer sleeve 600 with the outer surface 506 mated against the inner surface 602 of the retainer sleeve 600 and with the detent projections 640a and 640b extending into the detent recesses 508. The retainer sleeve 600 may be configured to deflect so as to allow the detent projections 640a and 640b to engage and/or disengage the detent recesses 508. For example, the retainer sleeve 600 may be constructed at least partially of a flexible material, including, but not limited to, a plastic material or an elastomeric material. In some implementations, the retainer sleeve 600 may be constructed entirely of such a flexible material. Additionally, or alternatively, the retainer sleeve 600 may be constructed of self-lubricating material that may either exude or shed lubricating substance. As another example, the retainer sleeve 600 may be made of metal, such as steel. The retainer sleeve 600 made of such material may exhibit low friction while maintaining dimensional stability.

As indicated above, FIG. 12 is provided as an example. Other examples may differ from what was described in connection with FIG. 12.

FIG. 13 is a cross section view of the assembly of the lock 500 and the retainer sleeve 600 described herein. FIG. 13 depicts the lock 500 in a rotated position. The lock 500 may be installed with the retainer sleeve 600 in the lock cavity 310 with the outer surface 506 of lock 500 mated to the central tab(s) 652, the end tab(s) 654, and the inner surface 602. When the lock 500 is disposed in this position, the open end 524 of the lock slot 522 may face rearward, as shown in FIG. 3. This position allows sliding insertion and removal of the post 210 into and out of the lock slot 522 through the open end 524. Accordingly, this position of the lock 500 may be referred to as an unlocked position.

To lock the post 210 inside the lock slot 522, the lock 500 may be rotated with respect to the lock rotation axis 502 to a locked position. In the locked position, the portion of lock skirt 504 adjacent to the closed end 526 may preclude sliding movement of the post 210 relative to the lock slot 522, thereby preventing sliding movement of the tip 300 relative to the adapter 200.

The anti-rotation feature 620 of the retainer sleeve 600 may be configured to allow the lock 500 to be rotated from the unlocked position to the locked position. For example, because the shell 630 of the anti-rotation feature 620 is sloped or curved, the lock 500 may be rotated from the unlocked position to the locked position when sufficient torque is applied to the lock 500. However, the anti-rotation feature 620 of the retainer sleeve 600 may be configured to block the lock 500 from being rotated from the locked position to the unlocked position. For example, as shown in FIG. 13, the locking surface 622 may prevent a rotation of the lock 500 past the anti-rotation feature 620. For example, because the locking surface 622 is substantially flat and/or perpendicular to the inner surface 602 of the retainer sleeve 600, the lock 500 may be prevented or blocked from rotating past the anti-rotation feature 620 about the lock rotation axis 502. For example, in some cases, vibrations or force may cause the detent projections 640a, 640b, and/or detent recesses 508 to deflect and disengage from one another. When detent projections 640a, 640b and detent recesses 508 are disengaged from one another, the outer surface 506 of the lock skirt 504 may slide along the inner surface 602 of the retainer sleeve 600 as the lock 500 rotates around the lock rotation axis 502. The anti-rotation feature 620 may block such rotation of the lock 500 to prevent the lock 500 from inadvertently rotating into the unlocked position.

As indicated above, FIG. 13 is provided as an example. Other examples may differ from what was described in connection with FIG. 13.

Figure 14:
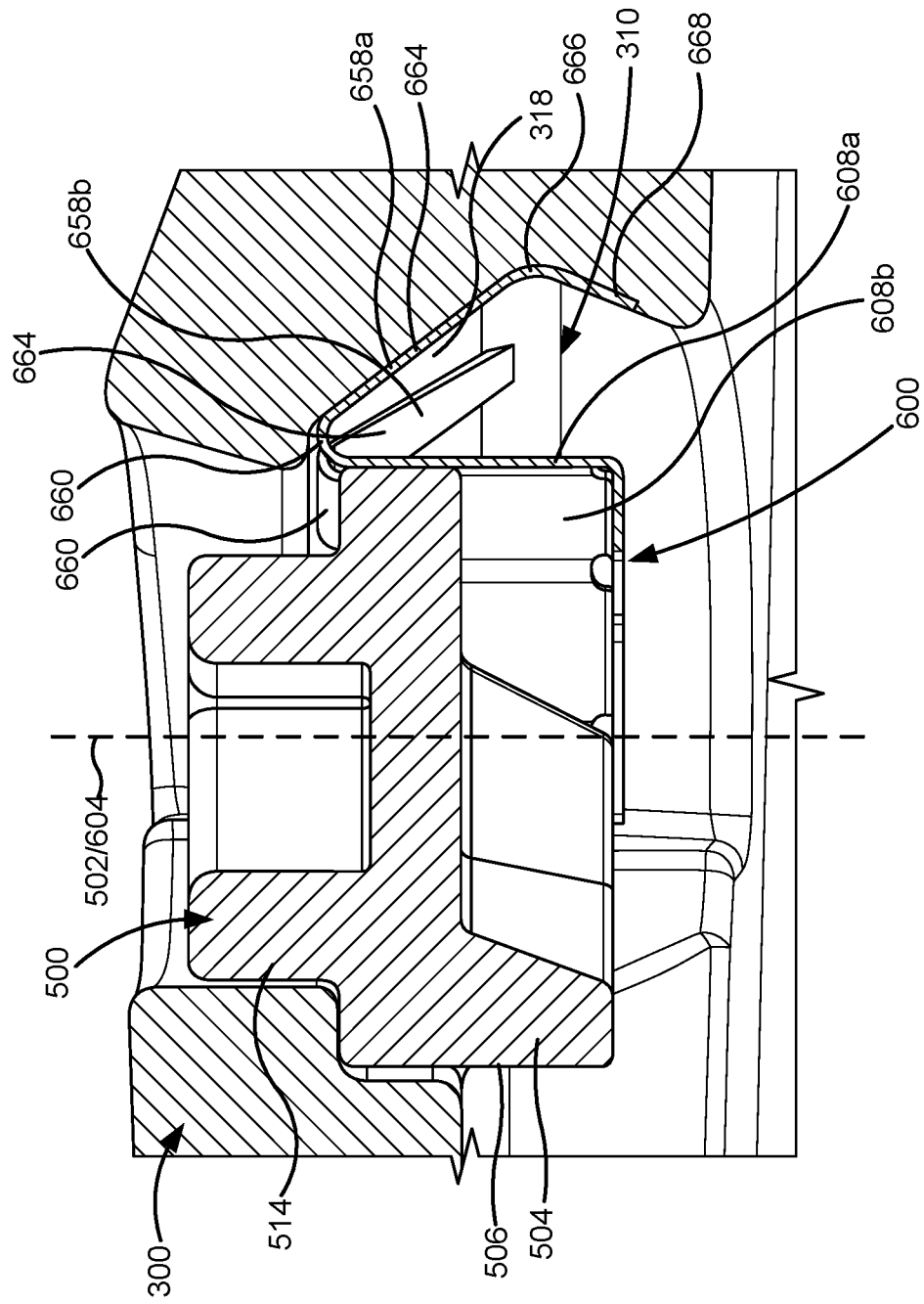
FIG. 14 is a cross section view of an assembly of the tip, the lock, and the retainer sleeve described herein.

FIG. 14 is a cross section view of an assembly of the tip 300, the lock 500, and the retainer sleeve 600 described herein. The retainer sleeve 600 may be formed to mate with the inner surface 318 of the lock cavity 310. For example, the retainer sleeve 600 may include the legs 658a-e forming a frustoconical shape configured to mate with a corresponding frustoconical portion of the inner surface 318 in the lock cavity 310. Therefore, the legs 658a-e may be configured to hold the retainer sleeve 600 and/or the lock 500 within the lock cavity 310.

As indicated above, FIG. 14 is provided as an example. Other examples may differ from what was described in connection with FIG. 14.

INDUSTRIAL APPLICABILITY

The retainer system 400 and ground engaging tools described herein may be applicable to various earth-working machines, such as, for example, excavators, wheel loaders, hydraulic mining shovels, cable shovels, bucket wheels, bulldozers, and draglines. When installed, the retainer system 400 and ground engaging tools described herein may protect various implements associated with the earth-working machines against wear in the areas where the most damaging abrasions and impacts occur and, thereby, prolong the useful life of the implements Some implementations described herein enable a secure and reliable attachment of ground engaging tools to various earth-working implements. For example, the retainer system 400 may include the lock 500 and the retainer sleeve 600. To attach the tip 300 to the adapter 200, the lock 500 and the retainer sleeve 600 may be assembled into the lock cavity 310. The lock cavity 310 opens into the side slot 320 that extends rearward, which allows passage of the post 210 of the adapter 200. Once post 210 is inserted inside the lock slot 522, the lock 500 may rotated about the lock rotation axis 502 to a locked position. In this position, the portion of the lock skirt 504 adjacent to the closed end 526 may preclude sliding of the post 210 into or out of the lock slot 522, thereby preventing sliding movement of the tip 300 relative to the adapter 200. In the locked position, detent recesses 508 of the lock 500 may engage detent projections 640a and 640b of the retainer sleeve 600, which may releasably hold lock 500 in the locked position.

The anti-rotation feature 620 of the retainer sleeve 600 may allow the lock 500 to be rotated from the unlocked position to the locked position. For example, the sloped shell 630 of the anti-rotation feature 620 may allow for the lock 500 to be rotated over and/or past the anti-rotation feature 620 and into the locked position. The anti-rotation feature 620 may be configured to prevent a rotation of the lock 500 about the lock rotation axis 502 from the locked position to the unlocked position. For example, because the detent projections 640a, 640b may releasably hold the lock 500 in position, the lock 500 may become disengaged from the detent projections 640a, 640b and may rotate about the lock rotation axis 502 (e.g., due to vibrations or another force that is not indented to rotate the lock 500 from the locked position). The locking surface 622 may be configured to contact a circumferential end of the lock skirt 504 to prevent or block a rotation of the lock 500.

For example, the locking surface 622 may be a substantially flat surface and/or the locking surface 622 may be substantially perpendicular to the inner surface 602 of the retainer sleeve 600. As a result, the locking surface 622, when the circumferential end of the lock skirt 504 contacts the locking surface 622, may prevent a rotation of the lock 500. Moreover, the locking surface 622 may be disposed at the first angle 624 that substantially corresponds to the angle 532 of the circumferential end of the lock skirt 504. As a result, when the circumferential end of the lock skirt 504 contacts the locking surface 622, there may be increased surface area of contact between the circumferential end of the lock skirt 504 and the locking surface 622. This increased surface area may provide an increased locking force, improving the ability of the anti-rotation feature 620 to prevent the rotation of the lock 500 about the lock rotation axis 502. For example, to detach the tip 300 from the adapter 200, sufficient torque may need to be applied to the lock 500 to cause the anti-rotation feature 620 to fail. In other words, the lock 500 may not be able to inadvertently rotate past the anti-rotation feature 620 into an unlocked position. This improves the ability of the retainer system 400, the lock 500 and/or the retainer sleeve 600 to ensure that the tip 300 remains attached to the adapter 200.

The legs 658a-e of the retainer sleeve 600 may be configured to mate with the inner surface 318 of the lock cavity 310 of the tip 300. The lock 500 may be configured to mate with the inner surface 602 of the retainer sleeve 600. The first bend 650, the second bend 660, the first extension 664, the second extension 668, and third bend 666 are configured to provide flexibility and a spring-like effect to the body 606. The legs 658a-e may help accommodate variances in the lock 500 and lock cavity 310 dimensions. The legs 658a-e may be configured to produce a compressive force against the lock cavity 310 to hold the lock 500 in place. For example, the first bend(s) 650 may be configured, when flexed, to encourage the plurality of plates 608a-e to induce a compressive force against the outer surface 506. The second bend(s) 660 may be configured, when flexed, to induce a compressive force against the inner surface 318 of the lock cavity 310 to keep the retainer sleeve 600 centered about the lock rotation axis 502. The third bend 666 may be configured to, when flexed, to induce a compressive force against the inner surface 318 of the lock cavity 310 to prevent the retainer sleeve 600 and the lock 500 from shifting positions or falling out during use.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A retainer sleeve for use with a lock in a ground engaging tool with a lock cavity, comprising:
a body including an at least partially annular configuration defining a retainer axis, the body including:
an inner surface configured to rotatably receive an outer surface of the lock;
a plurality of plates circumferentially joined together with respect to the retainer axis, wherein a first plate of the plurality of plates includes a first leg joined to the first plate extending away from the retainer axis and configured to contact the lock cavity; and
an anti-rotation feature, disposed on the first plate, extending inward from the inner surface toward the retainer axis, the anti-rotation feature including a locking surface configured to contact a lock skirt of the lock, the locking surface disposed at a first angle with respect to a bottom end of the first plate, wherein the anti-rotation feature comprises a shell extending radially away from the locking surface, the shell sloping from the locking surface to the inner surface, and the shell defining a cavity.

2. The retainer sleeve of claim 1, where the anti-rotation feature is radially disposed at a second angle with respect to a radial end of the body and the retainer axis.

3. The retainer sleeve of claim 1, wherein the locking surface comprises a first aperture defining a first opening to a cavity defined by a shell of the anti-rotation feature.

4. The retainer sleeve of claim 3, wherein the first plate comprises a second aperture defining a second opening to a cavity defined by a shell of the anti-rotation feature.

5. The retainer sleeve of claim 1, wherein the body comprises a detent projection extending from a side of at least one of the plurality of plates, the at least one of the plurality of plates not being adjacent to two plates of the plurality of plates, and the detent projection configured to engage a detent recess of the lock to releasably hold the lock.

6. The retainer sleeve of claim 1, wherein the first plate is adjacent to two plates of the plurality of plates.

7. A retainer sleeve for use with a lock in a ground engaging tool, the retainer sleeve comprising:
a plurality of plates joined together to form an annular shape around a retainer axis;
an anti-rotation feature, disposed on an inner surface of a first plate of the plurality of plates, extending inward toward the retainer axis, the anti-rotation feature including a locking surface configured to prevent a rotation of the lock relative to the retainer axis, wherein the locking surface is disposed at a first angle relative to a bottom end of the first plate and the locking surface is substantially perpendicular to the inner surface of the first plate; and
a detent projection extending from a side of a second plate of the plurality of plates configured to engage a detent recess of the lock to releasably hold the lock,
wherein the anti-rotation feature comprises a shell that defines a cavity, wherein the locking surface includes a first aperture to the cavity, and wherein the first plate includes a second aperture to the cavity.

8. The retainer sleeve of claim 7, wherein the first angle is from 20 degrees to 35 degrees.

9. The retainer sleeve of claim 7, wherein the first angle substantially corresponds to an angle of a lock skirt of the lock.

10. The retainer sleeve of claim 7, wherein the anti-rotation feature comprises a shell that defines a cavity, the shell extending from the inner surface of the first plate to the locking surface, wherein the shell includes at least one bend.

11. The retainer sleeve of claim 7, wherein the locking surface is a substantially flat surface.

12. The retainer sleeve of claim 7, wherein the anti-rotation feature is radially disposed at a second angle with respect to the detent projection and the retainer axis, wherein the second angle is from 30 degrees to 37.5 degrees.

13. A retainer system for a ground engaging tool, comprising:
a lock including:
a head portion having a tool interface;
a lock skirt extending from the head portion and including an outer surface, the lock skirt including an angled surface; and
a retainer sleeve including:
a body including an at least partially annular configuration around a retainer axis;
an anti-rotation feature, disposed on an inner surface of the body, extending inward toward the retainer axis, the anti-rotation feature including a locking surface configured to contact the angled surface of the lock skirt, wherein the locking surface is disposed at a first angle relative to a bottom end of the body, wherein the first angle substantially corresponds to the angled surface; and
a plurality of legs extending from a top end of the body away from the retainer axis, wherein at least two legs of the plurality of legs have different lengths.

14. The retainer system of claim 13, wherein the body further includes a plurality of plates, and wherein the anti-rotation feature is disposed on at least one plate of the plurality of plates.

15. The retainer system of claim 13, wherein the anti-rotation feature extends a distance from the inner surface of the body, wherein the distance is from 2 millimeters to 5 millimeters.

16. The retainer system of claim 13, wherein the anti-rotation feature includes a shell defining a cavity that extends from the inner surface of the body toward the retainer axis, wherein the shell has a curved edge and a flat edge, wherein the locking surface defines the flat edge.

17. The retainer system of claim 13, wherein the retainer sleeve further includes a detent projection extending from a radial end of the body configured to engage a detent recess of the lock to releasably hold the lock, and wherein the anti-rotation feature is configured to block a rotation of the lock relative to the retainer axis.

18. The retainer system of claim 13, wherein the anti-rotation feature includes a shell that defines a cavity, wherein the locking surface includes a first aperture to the cavity, and wherein the body includes a second aperture to the cavity.

\* \* \* \* \*